United States Patent
Chung

(10) Patent No.: US 9,339,144 B2
(45) Date of Patent: May 17, 2016

(54) APPARATUS FOR BOOSTING FIRE AND COLLECTING ASH

(71) Applicant: Kiosky Chung, Taichung (TW)

(72) Inventor: Kiosky Chung, Taichung (TW)

(*) Notice: Subject to any disclaimer, the term of this patent is extended or adjusted under 35 U.S.C. 154(b) by 416 days.

(21) Appl. No.: 13/898,024

(22) Filed: May 20, 2013

(65) Prior Publication Data

US 2014/0338653 A1    Nov. 20, 2014

(51) Int. Cl.
*F23J 1/00* (2006.01)
*A47J 37/07* (2006.01)

(52) U.S. Cl.
CPC ............ *A47J 37/0786* (2013.01); *A47J 37/079* (2013.01)

(58) Field of Classification Search
CPC .......................... A47J 37/0786; A47J 37/079
USPC ........................................................ 126/242
See application file for complete search history.

(56) References Cited

U.S. PATENT DOCUMENTS

| | | | |
|---|---|---|---|
| 5,809,991 A * | 9/1998 | Pai ...................... | A47J 37/0786 126/242 |
| D464,529 S * | 10/2002 | Eisinger ..................... | D7/402 |
| 7,866,311 B2 * | 1/2011 | Warner ................ | A47J 37/079 126/25 B |
| 2012/0073559 A1 * | 3/2012 | Mize ..................... | F24B 15/005 126/25 B |
| 2013/0042852 A1 * | 2/2013 | Cottrell ................... | F23Q 13/04 126/25 B |

* cited by examiner

*Primary Examiner* — Kenneth Rinehart
*Assistant Examiner* — Gajanan M Prabhu

(57) ABSTRACT

An apparatus for boosting fire and collecting ash includes a cup, a grate and a gate. The cup includes an upper chamber, a lower chamber, and apertures in communication with the lower chamber. The grate includes at least one aperture. The grate is placed in the cup between the upper and lower chambers. The gate includes at least one aperture corresponding to the aperture of the grate. The gate is pivotally placed in the cup between a first position and a second position. The aperture of the gate is in communication with the aperture of the grate to communicate the upper chamber with the lower chamber as the gate is in the first position. The gate shuts the aperture of the grate to shut the upper chamber from the lower chamber as the gate is in the second position.

14 Claims, 11 Drawing Sheets

APPARATUS FOR BOOSTING FIRE AND COLLECTING ASH

BACKGROUND OF INVENTION

1. Field of Invention

The present invention relates to barbecue and, more particularly, to an apparatus for boosting fire and collecting ash in barbecue.

2. Related Prior Art

Barbecue is a primitive way of cooking food. In modern barbecue, solid fuel is often burned in a barbecue grill. Such solid fuel may be wood or coal. The solid fuel is spread in the barbecue grill. It takes quite some time to light a fire on the solid fuel. In the combustion of the solid fuel, ash is produced. It is troublesome to collect the ash.

To reduce the time for lighting a fire on the solid fuel, there have been devised various apparatuses for boosting fire such as those disclosed in Taiwanese Patents 1275639, 1370222 and M332172 and U.S. Pat. Nos. 1,536,692, 3,191,556, 5,197,455, 5,230,325, 5,469,835 and 6,913,013. However, these apparatuses are not useful for collecting ash produced from the combustion of the solid fuel.

There have been devised various apparatuses for collecting the ash such as those disclosed in U.S. Pat. No. 6,182,559 and U.S. Patent Application Publication No. 20060054158. However, these apparatuses are not useful for boosting fire.

As disclosed in U.S. Pat. No. 3,209,743, a barbecue grill includes a bowl 11, a receptacle 23, a grate 26 and closure means. The bowl 11 includes a bottom element 24 that includes a grate 26 formed between two L-shaped flanges 27. The grate 26 inherently includes holes 25 defined therein. The receptacle 23 includes a side wall 29, a peripheral flange 40 formed on an upper edge of the side wall 29, and a cup 30 welded to a lower edge of the side wall 29. Holes 32 are defined in the cup 30. The closure means includes a plate 35 pivotally connected to the cup 30 by a rivet 36. In use, coal 43 is placed on the grate 26 while combustible material 33 is placed in the receptacle 23. The plate 35 in placed in an opening position where the plate 35 opens the holes 32. The combustible material 33 is ignited by a burning match. The peripheral flange 40 is engaged with the L-shaped flanges 27 to attach the receptacle 23 to the bowl 11. The coal 43 is ignited by the burning combustible material 33 and spread evenly on the bottom element 24 of the bowl 11. The plate 35 is pivoted to a closing position where the plate 35 covers the holes 32. After the combustion of the coal 43, ash is collected in the receptacle 23 through the grate 26. The receptacle 23 alone cannot be used to contain the coal 43. That is, the receptacle 23 cannot be used to boost fire without the synchronous use of the bowl 11 of the barbecue grill.

Therefore, the present invention is intended to obviate or at least alleviate the problems encountered in prior art.

SUMMARY OF INVENTION

It is the primary objective of the present invention to provide a compact apparatus for boosting fire and collecting ash.

To achieve the foregoing objective, the apparatus includes a cup, a grate and a gate. The cup includes an upper chamber, a lower chamber, and apertures in communication with the lower chamber. The grate includes at least one aperture. The grate is placed in the cup between the upper and lower chambers. The gate includes at least one aperture corresponding to the aperture of the grate. The gate is pivotally placed in the cup between a first position and a second position. The aperture of the gate is in communication with the aperture of the grate to communicate the upper chamber with the lower chamber as the gate is in the first position. The gate shuts the aperture of the grate to shut the upper chamber from the lower chamber as the gate is in the second position.

Other objectives, advantages and features of the present invention will be apparent from the following description referring to the attached drawings.

BRIEF DESCRIPTION OF DRAWINGS

The present invention will be described via detailed illustration of three embodiments referring to the drawings wherein.

DETAILED DESCRIPTION OF EMBODIMENTS

Figure 1:
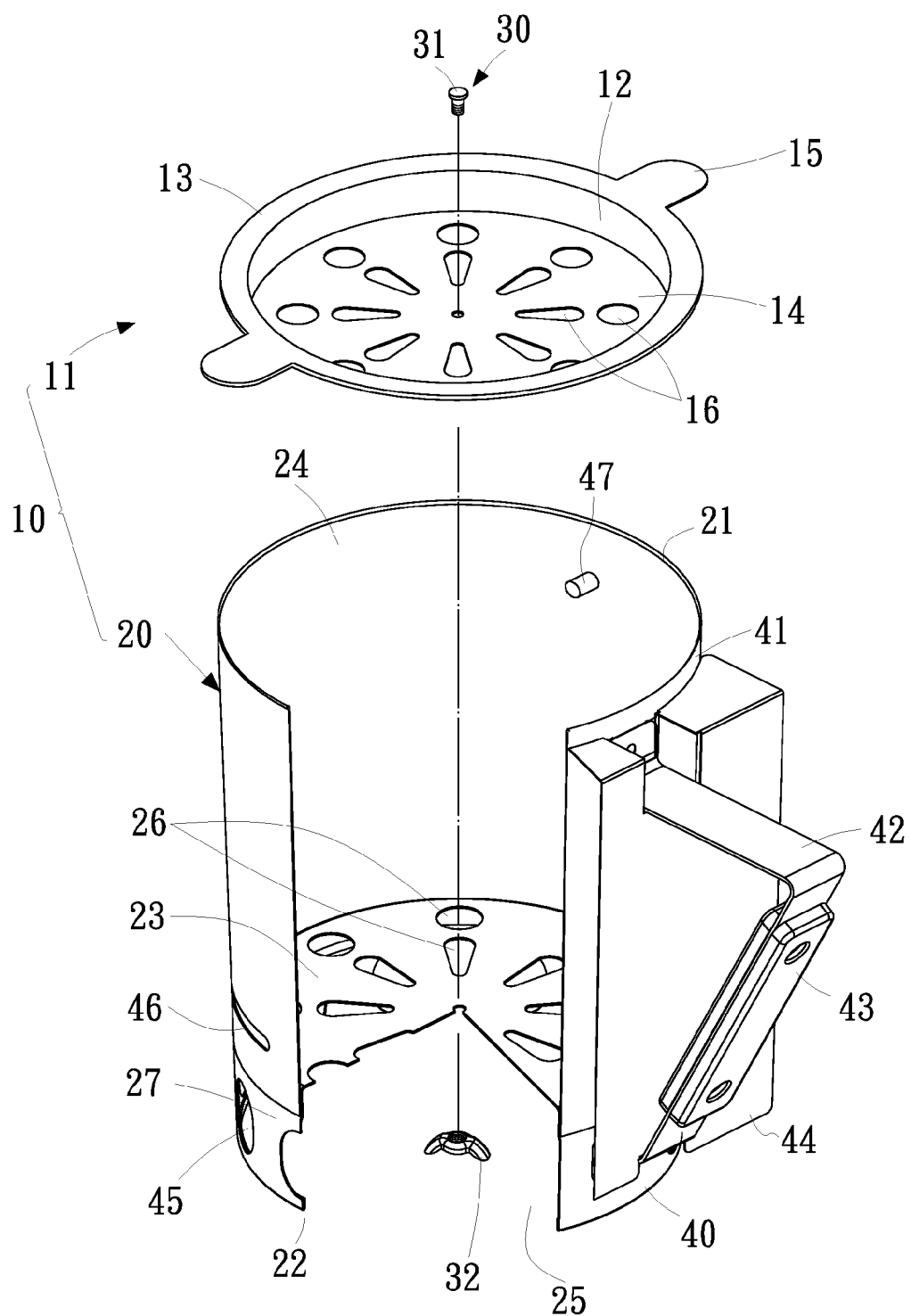
FIG. 1 is an exploded view of an apparatus for boosting fire and collecting ash according to the first embodiment of the present invention.
Figure 2:
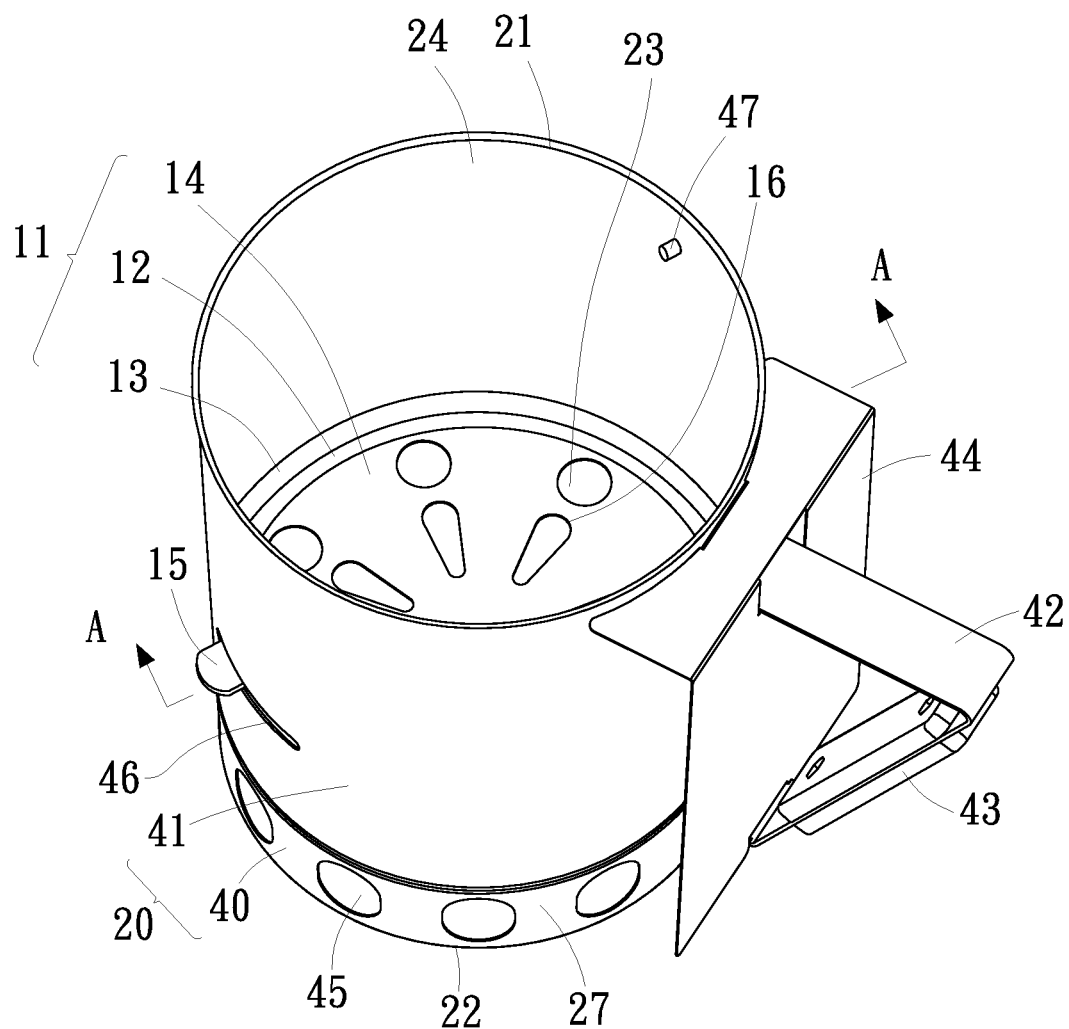
FIG. 2 is a perspective view of the apparatus shown in FIG. 1.
Figure 3:
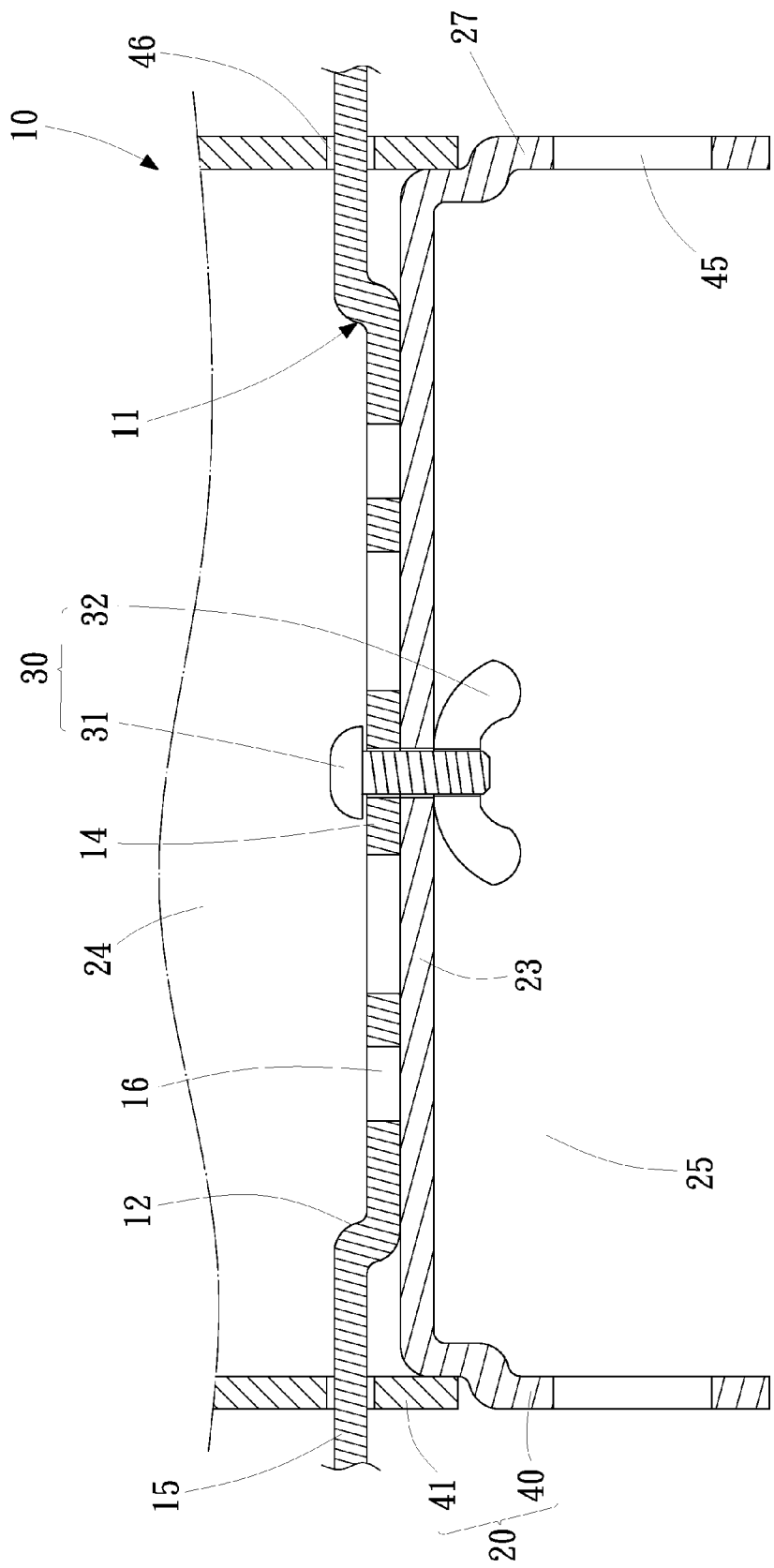
FIG. 3 is an enlarged, partial, cross-sectional view of the apparatus shown in FIG. 1.
Figure 4:
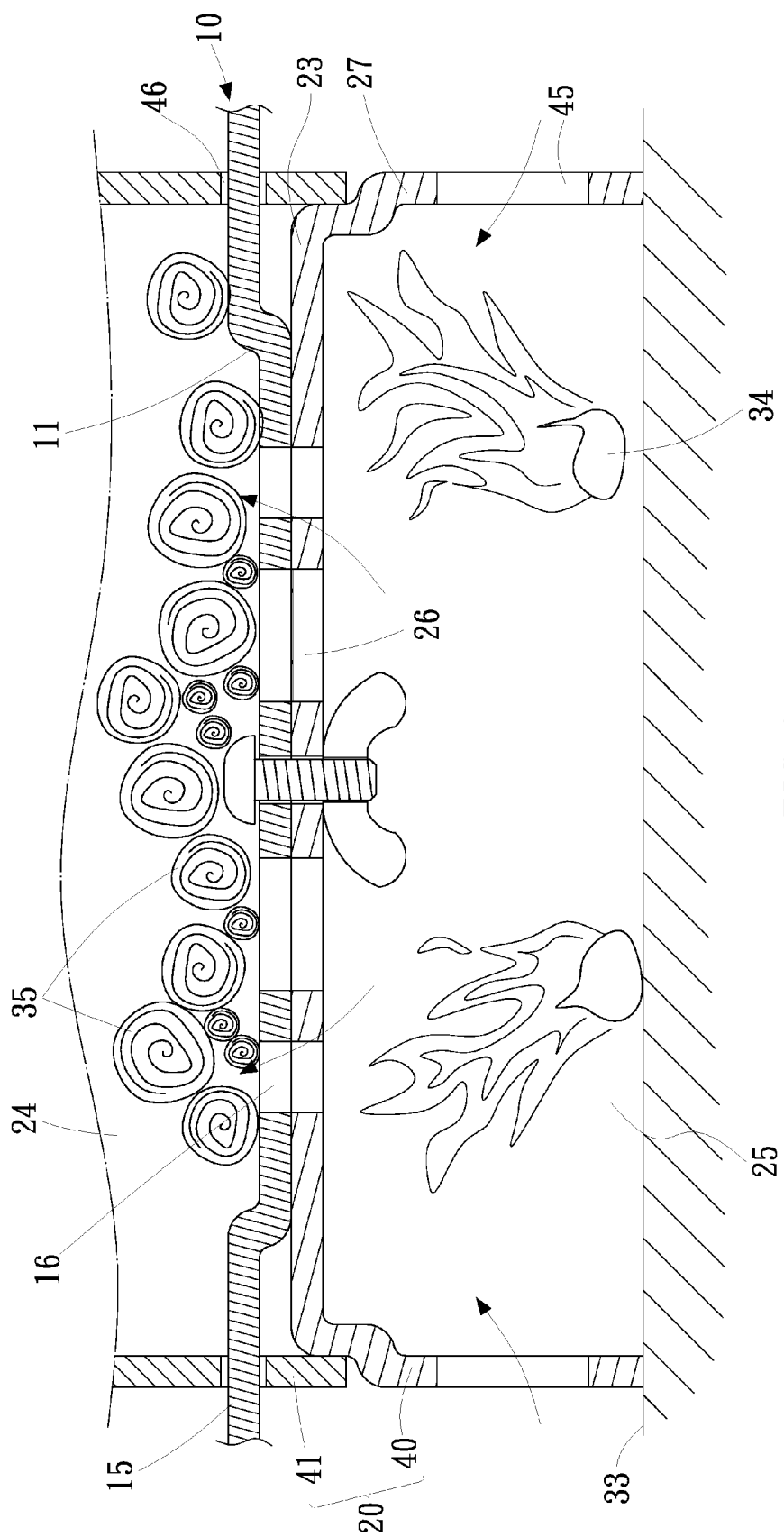
FIG. 4 shows operation of the apparatus shown in FIG. 3.

Referring to FIGS. 1-4, there is shown an apparatus 10 for boosting fire and collecting ash according to a first embodiment of the present invention. The apparatus 10 includes a cup 20 and a gate 11.

The gate 11 includes a flange 13, a bottom element 14, a wall 12 formed between the flange 13 and the bottom element 14, at least one operation element connected to the flange 13, and apertures 16 defined in the bottom element 14. The at least one operation element includes two opposite tabs 15 extending from the flange 13.

The cup 20 includes a base 40, a cylinder 41 and a handle 42. The base 40 includes a wall 27 extending downward from a grate 23 that includes apertures 26 defined therein. The wall 27 includes an upper portion that is smaller than a lower portion thereof. The upper portion of the wall 27 is fit in the cylinder 41. Preferably, the upper portion of the wall 27 is welded to the cylinder 41. Apertures 45 are defined in a lower portion of the wall 27. The stepped wall 27 includes an edge 22 that can be referred to as the lower edge of the cup 20. The base 40 defines a chamber 25 that can be referred to as the lower chamber of the cup 20.

The cylinder 41 includes an upper edge 21 that can be referred to as the upper edge of the cup 20. The cylinder 41 defines a chamber 24 that can be referred to as the upper chamber of the cup 20. The cylinder 41 includes two opposite slots 46 defined therein. Two pegs 47 are formed on an internal side of the cylinder 41. The apparatus 10 of the present invention can be attached to a cylinder 10 of a conventional barbecue grill such as the one disclosed in U.S. Pat. No. 6,182,559 by inserting the pegs 47 of the present invention in the slots 11 of the conventional barbecue grill.

The handle 42 is attached to an external side of the cylinder 41 by welding for example. An insulating grip 43 is attached to the handle 42. The insulating grip 43 includes two pieces of wood or plastics for sandwiching a portion of the handle 42. A radiator 44 is attached to the external side of the cylinder 41. Preferably, the radiator 44 is placed near the handle 42.

The gate 11 is substantially placed in the cup 20. However, each of the tabs 15 extends from the cup 20 through a corresponding one of the slots 46. The gate 11 is pivotally connected to the grate 23 by a fastening unit 30 that includes a screw 31 and a butterfly nut 32. The tabs 15 are operated to pivot the gate 11 on the grate 23 between a first position shown in FIG. 3 and a second position shown in FIG. 4.

As the gate 11 is placed in the first position on the grate 23, the apertures 16 are closed by the grate 23. Thus, air is not allowed to travel into the upper chamber 24 from the lower chamber 25. The apparatus 10 is used as an ash-collecting device.

As the gate 11 is placed in the second position on the grate 23, the apertures 16 are opened by the grate 23. Thus, air is allowed to travel into the upper chamber 24 from the lower chamber 25 into which the air travels from the exterior of the cup 10 through the apertures 45. The apparatus 10 is used as a fire-boosting device. Coal 35 is placed in the upper chamber 24. Highly combustible material 34 such as tinder is placed in the lower chamber 25. The highly combustible material 34 is ignited by a burning match (not shown) for example. The coal 35 can be ignited by the burning tinder 34. It should be noted that the coal 35 can easily be ignited by the burning tinder 34.

Figure 5:
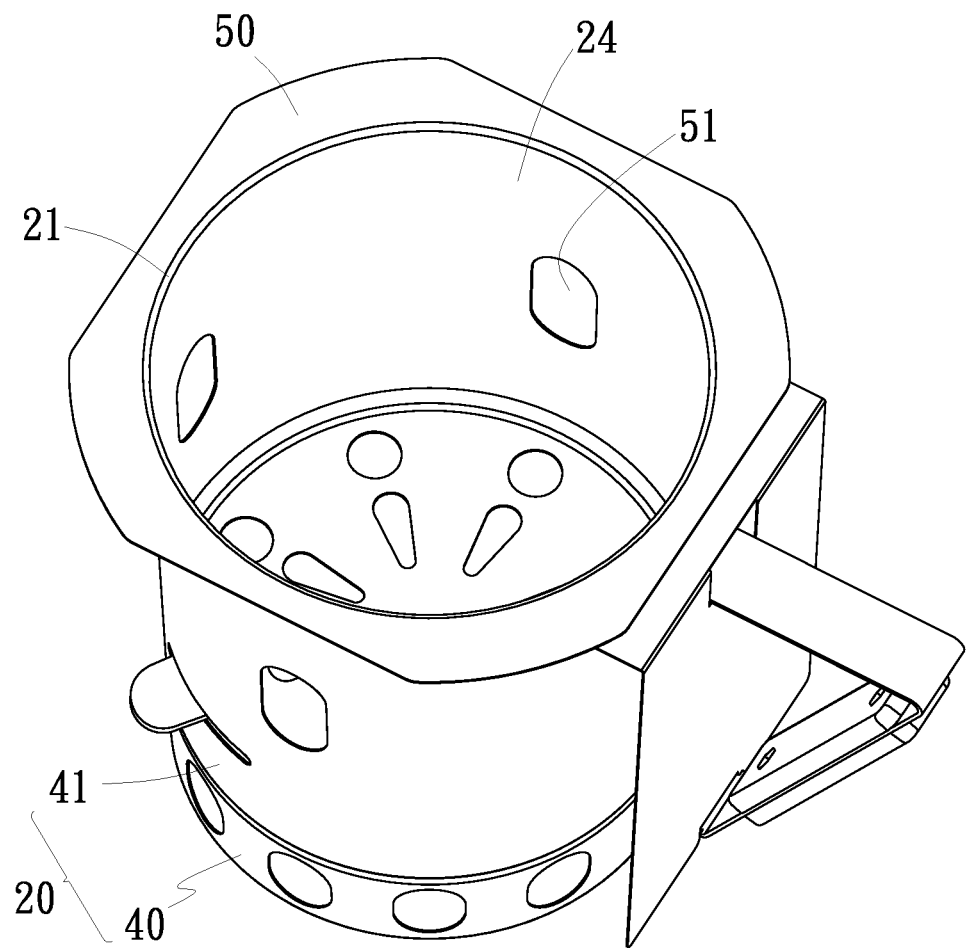
FIG. 5 is a perspective view of an apparatus for boosting fire and collecting ash according to the second embodiment of the present invention.
Figure 6:
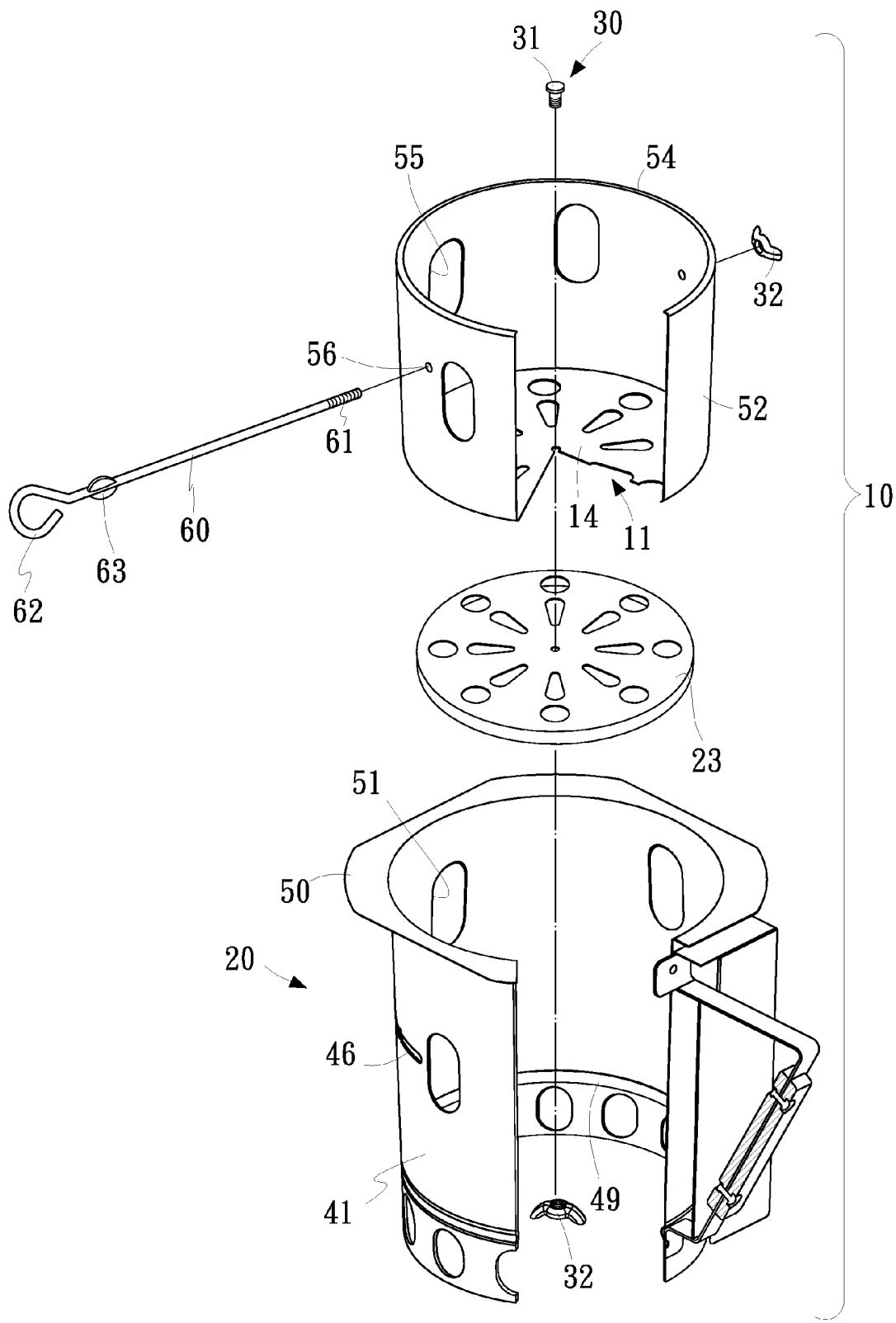
FIG. 6 is an exploded view of an apparatus for boosting fire and collecting ash according to the third embodiment of the present invention.

Referring to FIG. 5, there is shown an apparatus for boosting fire and collecting ash according to a second embodiment of the present invention. The second embodiment is like the first embodiment except two things. At first, the cup 20 includes a flange 50 extending from the upper edge 21 thereof. Secondly, the cup 20 includes windows 51 in communication with the upper chamber 24. The apparatus of the second embodiment can be attached to the barbecue grill of U.S. Pat. No. 3,209,743 by engaging the flange 50 with the L-shaped flanges 27 of the barbecue grill disclosed in U.S. Pat. No. 3,209,743. The windows 51 are useful for introducing air into the bowl 11 of the barbecue grill disclosed in U.S.

Referring to FIGS. 6-11, there is shown an apparatus for boosting fire and collecting ash according to a third embodiment of the present invention. The third embodiment is like the second embodiment except four things. At first, the base 23 is separated from the wall 27. The wall 27 is formed as an extension from the cylinder 41.

Secondly, the gate 11 includes a wall 52 instead of the wall 12. The wall 52 is higher than the wall 12. The wall 52 includes windows 55 corresponding to the windows 51. Moreover, the wall 52 includes two opposite apertures 56.

Thirdly, there is no flange, such as the flange 13, extending from an edge 54 of the wall 52. Finally, the at least one operation element includes a lever 60 instead of the tabs 15. The lever 60 includes a threaded portion 61, a grip 62 opposite to the threaded portion 61, and a flat portion 63 near the grip 62. The grip 62 is a hooked or lopped portion of the lever 60.

The lever 60 is inserted in the apertures 56 via the slots 46. The threaded portion 61 of the lever 60 is placed out of one of the slots 46 while the grip 62 and the flat portion 63 of the lever 60 are placed out of the other slot 46. The threaded portion 61 of the lever 60 is engaged with a butterfly nut 32.

Thus, the gate 11 is kept in the cup 20 by the lever 60, which is kept on the cup 20 by the flat portion 63 and the butterfly nut 32.

In another embodiment, the wall 52 includes only one aperture 56 and the cylinder 41 also includes only one slot 46. The butterfly nut 32 is placed against an internal side of the wall 52 while the flat portion 63 of the lever 60 is placed against the external side of the cylinder 41.

Figure 7:
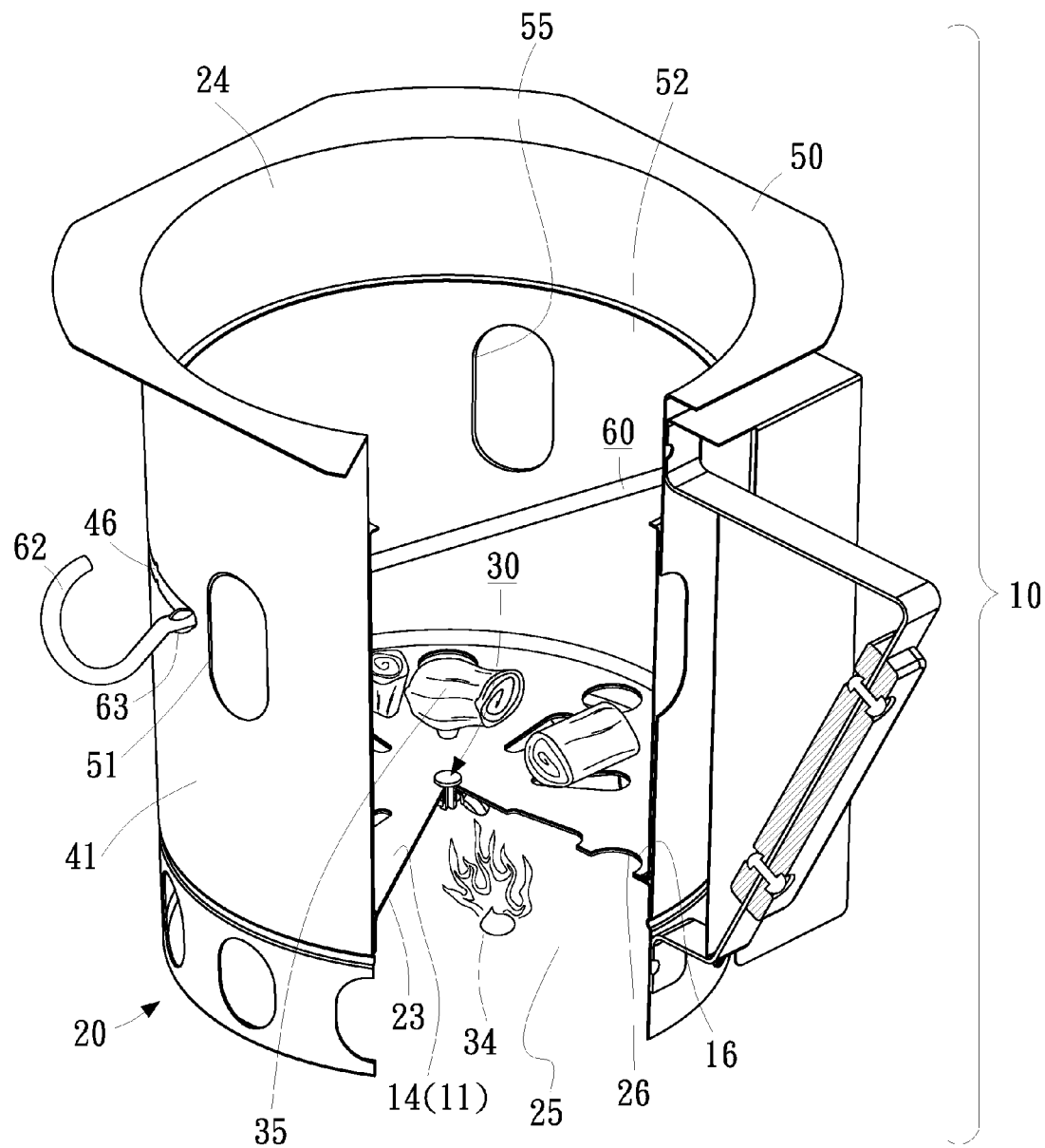
FIG. 7 is a cut-away view of the apparatus shown in FIG. 6 in operation.

Referring to FIG. 7, coal 35 is placed in the gate 11 while tinder 34 is placed below the grate 23. The tinder 34 is ignited by a burning match (not shown). The coal 35 can be ignited by the burning tinder 34.

Figure 8:
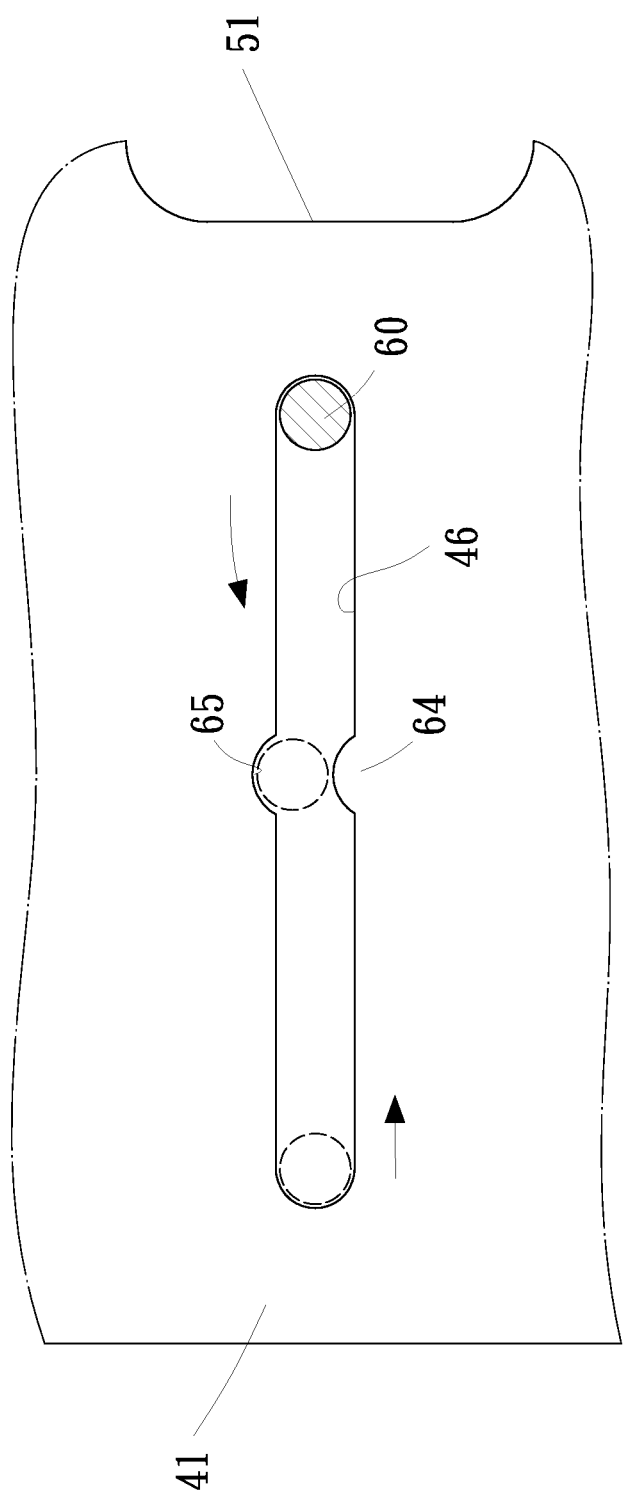
FIG. 8 is an enlarged, partial, side view of the apparatus shown in FIG. 7.

Referring to FIG. 8, each of the slots 46 is defined between an upper edge and a lower edge. The lower edge includes a boss 64 formed thereon. The upper edge includes a recess 65 defined therein. The width of each of the slots 46 remains constant from a left end to a right end. The width of the slots 46 is larger than the diameter of the lever 60 so that the lever 60 can be smoothly pivoted in the slots 46.

When the lever 60 is pivoted to the right ends of the slots 46, the windows 51 are completely closed by the gate 11 while the apertures 26 are completely opened, i.e., the apertures 26 are in perfect communication with the apertures 16. In this position, the apparatus 10 is suitable for boosting fire for providing the best stack effect.

When the lever 60 is pivoted to the left ends of the slots 46, the windows 51 are completely opened, i.e., the windows 51 are in perfect communication with the windows 55. The apertures 26 are completely closed by the gate 11. In this position, the apparatus 10 is suitable for collecting ash for providing the best stack effect.

The boss 64 is used as an indicator. When the lever 60 is placed to the right of the bosses 64, the apparatus 10 is suitable for boosting fire for providing the best stack effect. When the lever 60 is placed to the left of the bosses 64, the apparatus 10 is suitable for collecting ash for providing the best stack effect.

Figure 9:
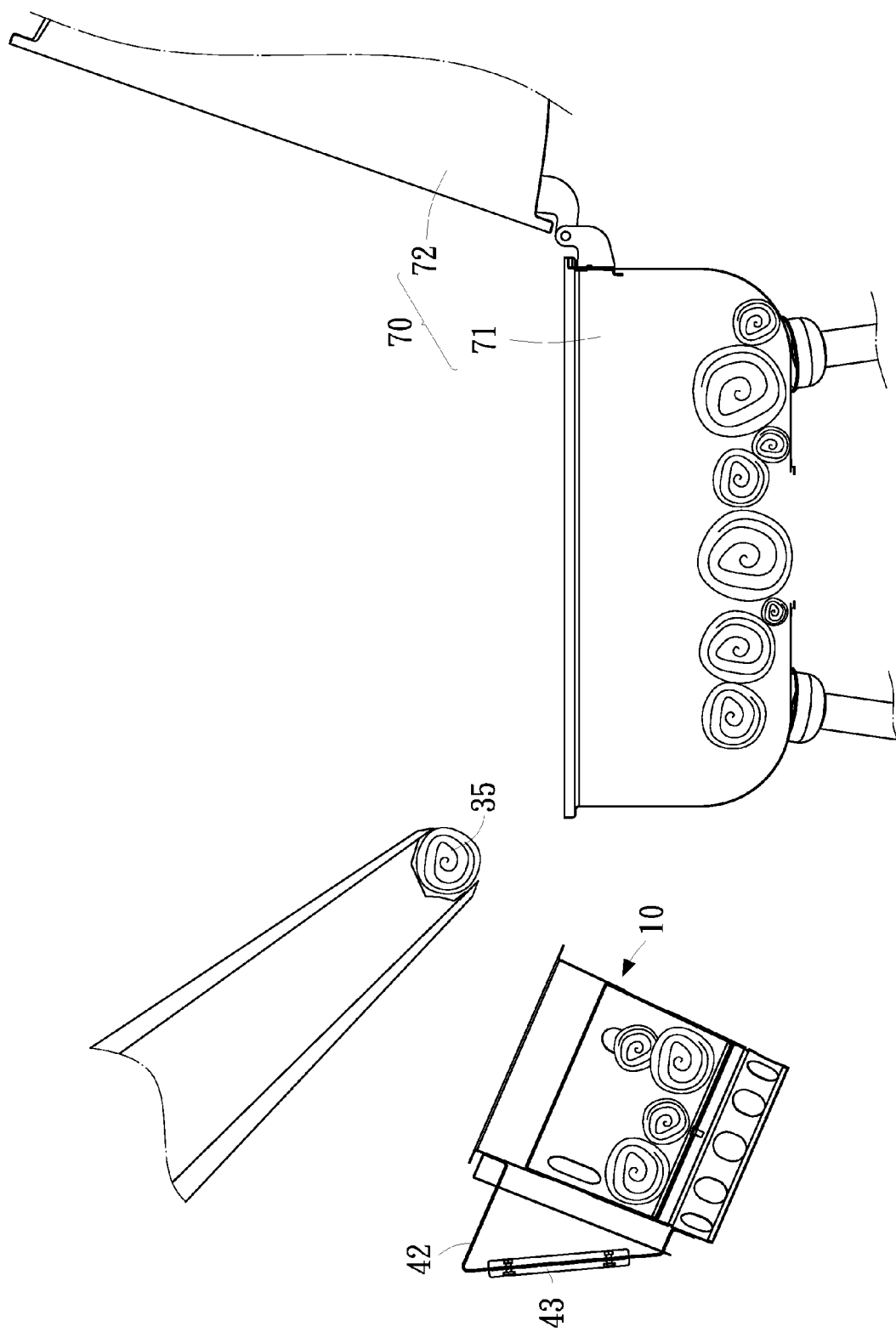
FIG. 9 is a side view of a barbecue grill and the apparatus shown in FIG. 7.

Referring to FIG. 9, there is shown a barbecue grill 70 that includes a bowl 71 and a cover 72. The coal 35 is moved into the bowl 71 from the apparatus 10 after the coal 35 is ignited. The burning coal 35 is evenly spread in the bowl 71.

Figure 10:
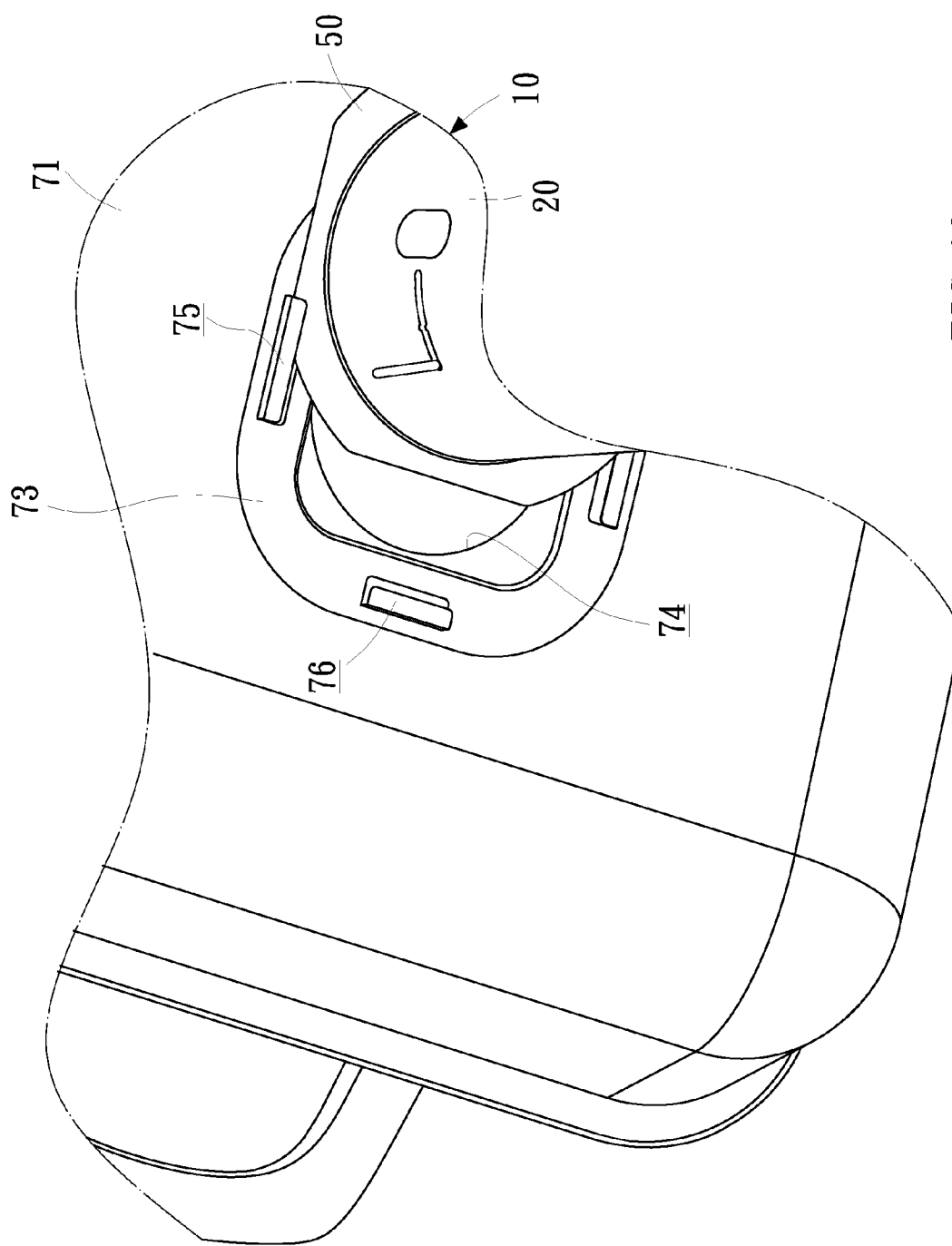
FIG. 10 is an enlarged, partial, perspective view of the barbecue grill and the apparatus shown in FIG. 9.
Figure 11:
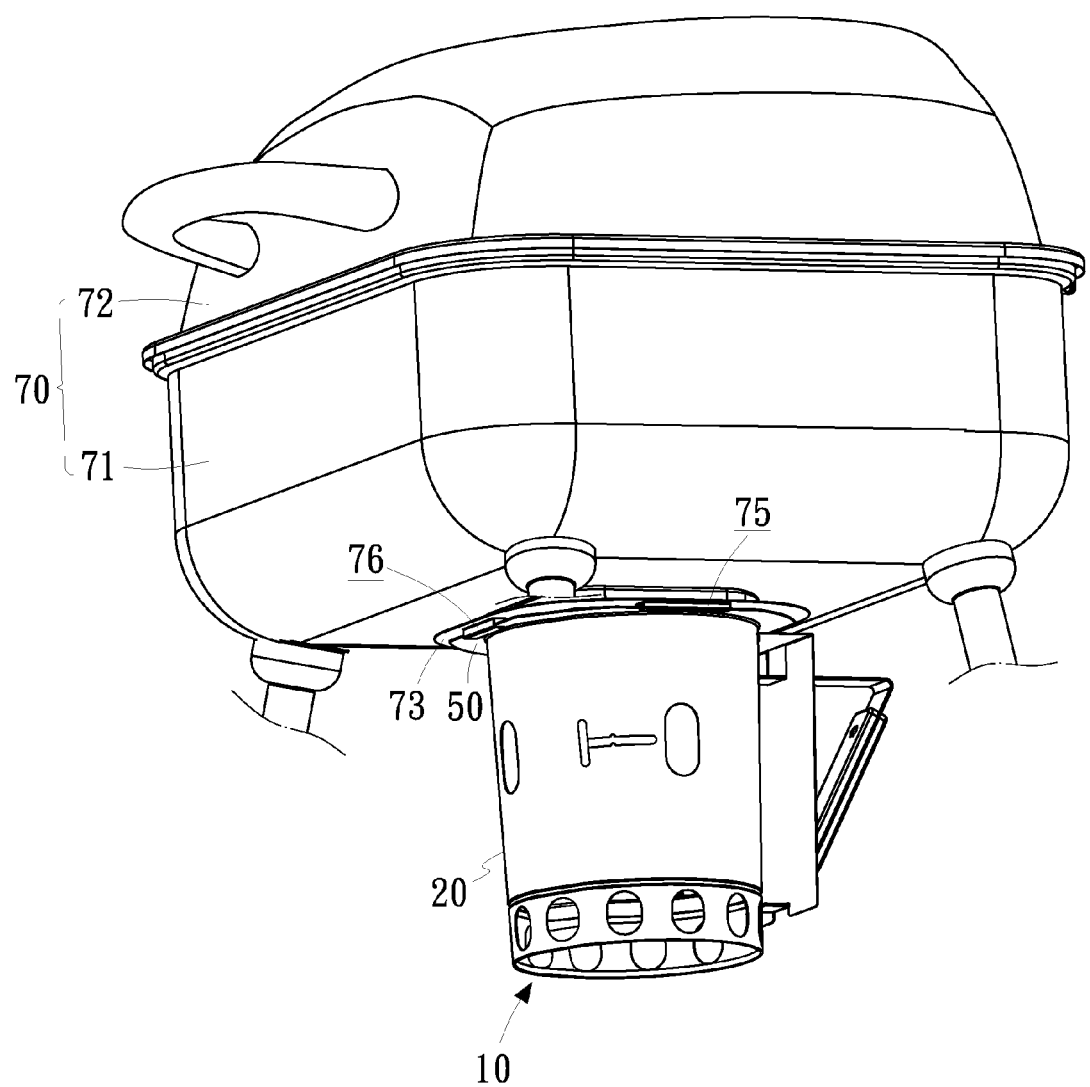
FIG. 11 is a perspective view of the barbecue grill and the apparatus shown in FIG. 10.

Referring to FIGS. 10 and 11, the bowl 71 includes an opening 74. An engagement piece 73 is welded to the bottom thereof around the opening 74. The engagement piece 73 includes two parallel tracks 75 and a stop 76. The tracks 75 and the stop 76 are identical L-shaped flanges in different positions. The flange 50 is slid on the tracks 75 so that the flange 50 is stopped by the stop 76. Thus, the apparatus 10 is connected to the bowl 71. The apparatus 10 is used for collecting ash from the bowl 71.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. An apparatus for boosting fire and collecting ash including: a cup including an upper chamber, a lower chamber, a slot, and apertures in communication with the lower chamber; a grate including at least one aperture, wherein the grate is placed in the cup between the upper and lower chambers; a gate including at least one aperture corresponding to the aperture of the grate, wherein the gate is pivotally placed in the cup between a first position and a second position, wherein the aperture of the gate is in communication with the aperture of the grate to communicate the upper chamber with the lower chamber as the gate is in the first position, wherein the gate shuts the aperture of the grate to shut the upper chamber from the lower chamber as the gate is in the second position; and a lever inserted though the slot and formed with an end connected to the gate in the cup, another end located out of the cup, and a flat portion adapted for contact with the cup, wherein the lever is movable along the slot when the lever is handled to pivot the gate.

2. The apparatus according to claim 1, including a handle connected to the cup.

3. The apparatus according to claim 2, including an insulating grip connected to the handle.

4. The apparatus according to claim 2, including a radiator connected to the cup near the handle.

5. The apparatus according to claim 1, wherein the cup includes a flange for engagement with an engagement piece of a barbecue grill.

6. The apparatus according to claim 1, wherein the gate includes a wall connected to the lever.

7. The apparatus according to claim 6, wherein the wall includes at least one aperture for receiving the rods.

8. The apparatus according to claim 7, wherein the lever includes a grip placed out of the cup.

9. The apparatus according to claim 8, wherein the lever includes a threaded portion engaged with a nut placed against the wall.

10. An apparatus for boosting fire and collecting ash comprising:
   a cup comprising an upper chamber, a lower chamber, two slots, and apertures in communication with the lower chamber;
   a grate made with at least one aperture and placed in the cup between the upper and lower chambers;
   a gate comprising at least one aperture corresponding to the aperture of the grate and a wall made with two apertures, wherein the gate is pivotally placed in the cup between a first position and a second position, wherein the aperture of the gate is in communication with the aperture of the grate to communicate the upper chamber with the lower chamber as the gate is in the first position, wherein the gate shuts the aperture of the grate to shut the upper chamber from the lower chamber as the gate is in the second position; and
   a lever inserted in the apertures of the wall through the slots so that the lever is connected to the wall and movable along the slots when the lever is handled to pivot the gate.

11. The apparatus according to claim 10, wherein the lever includes a grip placed out of the cup.

12. The apparatus according to claim 11, wherein the lever includes a threaded portion engaged with a nut placed against the cup.

13. The apparatus according to claim 12, wherein the lever includes a flat portion placed against the cup.

14. An apparatus for boosting fire and collecting ash comprising:
   a cup comprising an upper chamber, a lower chamber, a slot, at least one window, and apertures in communication with the lower chamber;
   a grate made with at least one aperture and placed in the cup between the upper and lower chambers;
   a gate comprising at least one aperture corresponding to the aperture of the grate and a wall made with at least one window, wherein the gate is pivotally placed in the cup between a first position and a second position, wherein the aperture of the gate is in communication with the aperture of the grate to communicate the upper chamber with the lower chamber as the gate is in the first position, wherein the gate shuts the aperture of the grate to shut the upper chamber from the lower chamber as the gate is in the second position; wherein the wall shuts the window of the cup as the gate is in the first position, wherein the window of the wall is in complete communication with the window of the cup as the gate is in the second position; and
   a lever inserted through the slot and connected to the wall so that the lever is movable along the slots when the lever is handled to pivot the gate.

\* \* \* \* \*